(12) United States Patent
Diehl et al.

(10) Patent No.: US 9,366,347 B2
(45) Date of Patent: Jun. 14, 2016

(54) MULTIPORT SEVERE SERVICE BALL VALVE

(71) Applicant: Mogas Industries, Inc., Houston, TX (US)

(72) Inventors: Timothy Way Diehl, Cypress, TX (US); Hugh Wesley Barrett, Spring, TX (US); Charles Miller Walker, Spring, TX (US)

(73) Assignee: Mogas Industries, Inc., Houston, TX (US)

( * ) Notice: Subject to any disclaimer, the term of this patent is extended or adjusted under 35 U.S.C. 154(b) by 0 days.

(21) Appl. No.: 14/367,538

(22) PCT Filed: Mar. 22, 2013

(86) PCT No.: PCT/US2013/033588
§ 371 (c)(1),
(2) Date: Jun. 20, 2014

(87) PCT Pub. No.: WO2013/142833
PCT Pub. Date: Sep. 26, 2013

(65) Prior Publication Data
US 2015/0184764 A1    Jul. 2, 2015

Related U.S. Application Data

(60) Provisional application No. 61/614,486, filed on Mar. 22, 2012.

(51) Int. Cl.
*F16K 5/06* (2006.01)
*F16K 5/10* (2006.01)
*F16K 11/22* (2006.01)
(Continued)

(52) U.S. Cl.
CPC ............... *F16K 11/20* (2013.01); *F16K 11/10* (2013.01); *F16K 11/205* (2013.01); *F16K 27/067* (2013.01); *F16L 41/023* (2013.01); *Y10T 137/0318* (2015.04); *Y10T 137/0402* (2015.04); *Y10T 137/4238* (2015.04); *Y10T 137/4259* (2015.04); *Y10T 137/6416* (2015.04); *Y10T 137/794* (2015.04); *Y10T 137/87338* (2015.04);
(Continued)

(58) Field of Classification Search
CPC .................................. F16K 11/10; F16K 11/20
USPC ........ 137/601.16, 625.31, 883, 887; 210/252, 210/253
See application file for complete search history.

(56) References Cited

U.S. PATENT DOCUMENTS 1,099,713 A * 6/1914 Morris .................... F16K 11/22
137/883
3,237,642 A * 3/1966 Tomson ........................ 137/887
(Continued)

OTHER PUBLICATIONS

PCT/US2013/033588 International Search Report and Written Opinion, Jun. 17, 2013.

*Primary Examiner* — John K Fristoe, Jr.
*Assistant Examiner* — Seth W MacKay-Smith
(74) *Attorney, Agent, or Firm* — Daniel N. Lundeen; Lundeen & Lundeen PLLC

(57) ABSTRACT

A multiport severe service ball valve comprising a main bore in fluid communication with a plurality of auxiliary bores arranged about the main bore such that a maximum spacing between a flow control element of the auxiliary bore and an outer surface of the main bore is less than two times a diameter of the main bore. Systems comprising the multiport severe service ball valve and methods of using it are also disclosed.

22 Claims, 9 Drawing Sheets

(51) Int. Cl.
*F16K 11/20* (2006.01)
*F16K 27/06* (2006.01)
*F16K 11/10* (2006.01)
*F16L 41/02* (2006.01)

(52) U.S. Cl.
CPC .. *Y10T 137/87772* (2015.04); *Y10T 137/87877* (2015.04); *Y10T 137/87909* (2015.04)

(56) References Cited

U.S. PATENT DOCUMENTS

| | | | | |
|---|---|---|---|---|
| 3,797,527 | A | * | 3/1974 | Bain ............................. 137/832 |
| 3,935,108 | A | * | 1/1976 | Forgues ........................ 210/340 |
| 4,281,683 | A | * | 8/1981 | Hetherington et al. ....... 137/606 |
| 5,064,167 | A | * | 11/1991 | DiPalma ....................... 251/214 |
| 5,074,522 | A | * | 12/1991 | Reynolds et al. ............. 251/127 |
| 5,482,253 | A | * | 1/1996 | Klyde ...................... 251/315.07 |
| 5,628,339 | A | | 5/1997 | Isringhausen |
| 5,676,348 | A | * | 10/1997 | Ungchusri et al. ............ 251/316 |
| 5,893,969 | A | * | 4/1999 | Goldman ........................ 210/95 |
| 5,934,327 | A | | 8/1999 | Nelson et al. |
| 6,047,729 | A | * | 4/2000 | Hollister et al. .............. 137/557 |
| 6,474,363 | B1 | | 11/2002 | Stephenson |
| 6,558,554 | B1 | * | 5/2003 | Jones et al. ................... 210/739 |
| 6,668,860 | B1 | * | 12/2003 | Pas et al. .................. 137/599.14 |
| 6,832,621 | B1 | * | 12/2004 | Williams ................. B08B 9/00 134/166 C |
| 7,080,661 | B1 | | 7/2006 | Ayer et al. |
| 7,223,298 | B2 | * | 5/2007 | Platt et al. ....................... 95/286 |
| 7,896,959 | B1 | * | 3/2011 | Schopf, Jr. ...................... 96/417 |
| 9,004,106 | B2 | * | 4/2015 | Schlichter et al. ............ 137/637 |
| 2007/0252102 | A1 | * | 11/2007 | Kemp ........................... 251/180 |
| 2011/0260088 | A1 | * | 10/2011 | Cunningham ........... 251/315.01 |

* cited by examiner

MULTIPORT SEVERE SERVICE BALL VALVE

CROSS REFERENCE TO RELATED APPLICATIONS

This application claims priority to U.S. Provisional Application Ser. No. 61/614,486 filed Mar. 22, 2012.

BACKGROUND

Severe service ball valves are utilized in a number of processes and under a variety of conditions, including extreme temperatures, high pressures, abrasive particles, acidic fluids, heavy solids buildup, critical safety applications, large pressure differentials, velocity control, noise control, etc. Severe service ball valves may be characterized as valves suitable for use under relatively high pressures, pressure drops and/or temperatures. Pressure and/or pressure differentials may exceed 0.7 MPa (100 psi), 7 MPa (1000 psi) or even 70 MPa (10,000 psi), and temperatures may exceed 100° C., 200° C. or even 500° C. Difficult process streams may be corrosive, may include abrasive particulates, may be prone to solidification unless maintained above a particular temperature, may be prone to solids buildup, and the like. Severe service ball valves are characterized by metal-to-metal sealing contact between the ball and the seats of the valve.

In various processes, severe service ball valves may be employed in redundant legs or pathways of a process for a configuration which allows for selectively isolating the two pathways to maintain a process flow (or isolation) via one pathway, while providing service or maintenance on the unused, isolated leg. Likewise, various pathways may be employed in a severe service process in which different process steps may be required depending on the characteristics of a particular stream. An arrangement that has been used to provide for multiple paths within a system is shown in FIG. 1, wherein a multiport manifold 1 is attached to two or more severe service ball valves 2 via an intermediate flanged connection. However, dead volume in flow paths leading up to and within such alternate legs may be problematic in severe service applications, e.g., solids may accumulate in non-flow areas and stresses due to thermal cycling may become extreme.

SUMMARY

The present disclosure is generally directed to a multiport valve, systems comprising a multiport valve and methods involving the multiport valves and systems. In embodiments, the multiport valve may be a ball valve or a severe service ball valve. In an embodiment, a multiport valve comprises a valve body comprising a main bore and a plurality of auxiliary bores formed therein. A spherical flow control element is located in each of the auxiliary bores with a respective valve seat in metal-to-metal sealing contact to form a seal between the flow control element and the valve body. In the transverse auxiliary bore(s), a maximum spacing of a nearest surface of the flow control element from a central longitudinal axis of the main bore is less than two times a diameter of the main bore. In an embodiment, a dead space between the main bore and the surface of the transverse auxiliary flow control element is no deeper than one main bore diameter from the surface of the main bore projected across the intersecting auxiliary bore opening to the flow control element.

In an embodiment, a method comprises selectively operating the flow control elements in the multiport valves between opened and closed position for fluid flow or isolation. In embodiments, the flow control elements may be operated independently for simultaneous or sequential operation.

In an embodiment, a system comprises a plurality of process elements respectively disposed in a plurality of parallel processing paths between first and second ones of the multiport valves, a flow path between the main bore and a respective one of the parallel processing paths through the respective auxiliary bore and flow control element, a system inlet to the main bore of the first multiport valve and a system outlet from the main bore of the second multiport valve. Process elements in embodiments may be critical equipment requiring standby redundancy, ones periodically requiring increased processing capacity in a parallel processing paths, ones requiring frequent servicing, e.g. equipment with high failure or fouling rates, beds or other media requiring regeneration or replacement, etc., such as pressure letdown valves, flow control valves, isolation valves, filters, heat exchangers, noise attenuation elements, and so on. The system may be modular, e.g., skid mounted, for transportation to and from the process unit and a remote assembly or servicing location away from the process unit.

In an embodiment, a method of processing fluid flow through the process elements in the system comprises installing the system in a process unit with the main bore of the first multiport valve connected to an upstream fluid supply and the main bore of the second multiport valve connected to a downstream process line; selectively opening the flow control elements in the respective auxiliary bores of a first one of the parallel processing paths to pass fluid through the respective process element; and selectively closing the flow control elements in the respective auxiliary bores of a second one of the parallel processing paths to isolate the respective process element. In embodiments, the isolated process element may be serviced and thereafter returned to service by opening the flow control elements, and optionally closing the flow control elements of another parallel processing path for servicing the respective process element.

DETAILED DESCRIPTION

Figure 1:
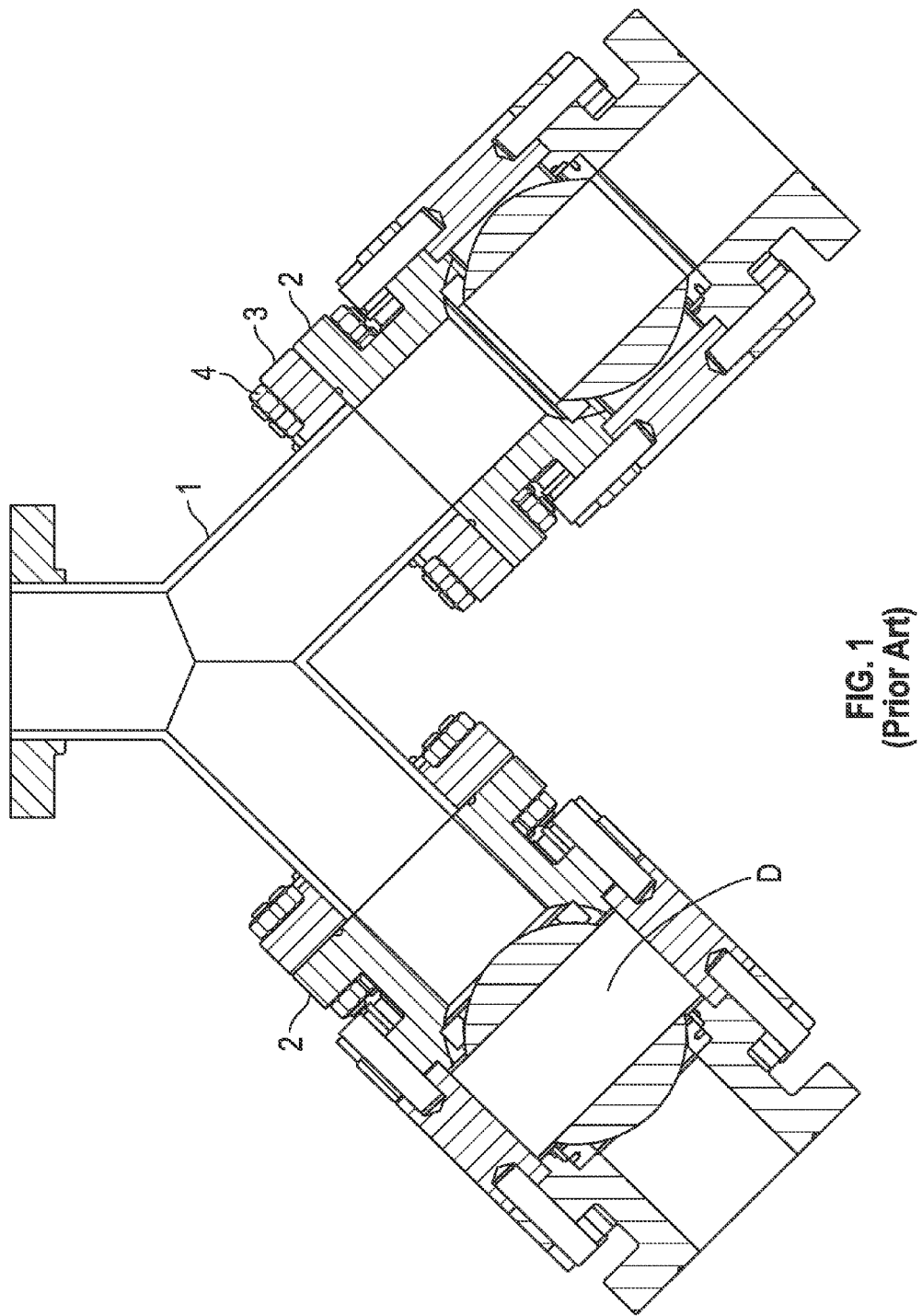
FIG. 1 is a cross-sectional plan view of a multivalve manifold arrangement.

The embodiments disclosed herein are merely exemplary of the disclosure, which may be embodied in various forms.

Specific structural and functional details disclosed herein are not intended to be limiting, but merely illustrations that can be modified within the scope of the attached claims.

For purposes herein, a bore is defined as a hole, passage, conduit, flow-path or the like at least partially bounded along an axis by the valve body, having an opening to a surface or end of the valve body and formed by or as if by boring. A bore may be produced by contacting a solid body with some rotary cutting instrument removing a core of material therefrom, and/or by casting or forging a body to comprise the bore.

For purposes herein, a valve body is defined as a monolithic valve component in which the main bore and auxiliary bores for the through flow of fluid are formed and to which other valve components are attached by bolting, threading, clamping, friction fitting, adhesive, etc. Monolithic as used herein refers to a component made from a single piece or block of metal formed or as if formed by casting, by forging, by machining from a larger piece or by welding two or more pieces together.

For purposes herein the main bore is the open bore that is intersected by a plurality of transverse bores, and the auxiliary bores are the intersecting bores and, if present, the bore coaxial with the main bore and opening at the surface or end of the valve body opposite that of the main bore. While the coaxial auxiliary bore may be open and/or otherwise physically similar or identical to the main bore, in general the main bore may be used as an unobstructed fluid inlet whereas the coaxial auxiliary bore may be used as a fluid outlet and may optionally include a flow control element mounted therein. The extent of the main bore is from the opening of the main bore to the end of the bore, or if there is a coaxial auxiliary bore, to the intersection of the main bore and the transverse auxiliary bore closest to the opening of the coaxial auxiliary bore at the surface or end of the valve body. The extent of an auxiliary bore is from the opening at the end or surface of the valve body to the outer surface or projection of the outer surface of the main bore across the end of the transverse auxiliary bore, and also including the valve body cavity or portion thereof formed in the valve body. By intersecting is meant that the inner end of the auxiliary bore is open to an outer surface or projection of the outer surface of the main bore across the end of the transverse auxiliary bore for fluid communication between the main and auxiliary bores—it is not a requirement for intersecting bores that their longitudinal axes intersect, but they may. As used herein, the "surface," "outer surface" and "inner diameter" of a bore are synonymous.

For purposes herein a severe-service ball valve is characterized as a valve suitable for use: at a rated pressure and/or pressure differential in excess of 0.7 MPa (100 psi), or 7 MPa (1000 psi), or 70 MPa (10,000 psi); or at a rated temperature in excess of 100° C., or 200° C. or 500° C.; or with corrosive streams; or with streams which include or may include abrasive particulates; or with streams prone to solidification unless maintained above a temperature of 60° C. or higher; or any combination thereof.

For purposes herein a metal-to-metal seal is one which achieves a seal by contact between two surfaces of metal or thinly (less than 1 mm) ceramic-coated metal, e.g., a metal flow control element and a metal seat.

For purposes herein a spherical element is one having an arcuate convex or concave surface with points an equal distance (radius) from an origin.

For purposes herein a valve body cavity is an enlarged recess formed along or at an end of a bore to wholly or partially receive a flow control element to block or allow fluid flow through the bore.

According to embodiments herein, a multiport valve comprises a valve body comprising a main bore in fluid communication with a plurality of auxiliary bores comprising at least one transverse auxiliary bore intersecting the main bore. In embodiments a spherical flow control element is rotatably received in a valve body cavity associated with the at least one transverse auxiliary bore and is rotatable between open and closed positions. In embodiments a valve seat provides metal-to-metal sealing contact between the flow control element and the valve body. In embodiments a spacing of the flow control element in the at least one transverse auxiliary bore is within two main bore diameters from a central longitudinal axis of the main bore. In embodiments, the multiport valve is a severe service ball valve.

In embodiments, two of the transverse auxiliary bores intersecting the main bore in a Y configuration wherein central longitudinal axes of the transverse auxiliary bores are arranged within the valve body at an angle from about 95° to about 175°, or from about 105° to about 165°, or from about 120° to about 150°, or from about 125° to about 145°, or about 135°, relative to the central longitudinal axis of the main bore. In embodiments, the main bore may terminate at a coaxial concave frustoconical recess, or at a transverse convex surface which may be a coaxial and/or frustoconical projection, or at a removably attached (to the valve body at the end of the bore) impingement element, which may carry a wear surface which may be ceramic.

In embodiments, the valve further comprises a purge flow passage(s) into the valve body cavity(ies).

In embodiments, the valve further comprises an auxiliary bore coaxial with the main bore, a spherical flow control element rotatable in a valve body cavity of the coaxial auxiliary bore between open and closed positions, and a valve seat in metal-to-metal sealing contact between the coaxial auxiliary flow control element and the valve body.

In embodiments, a spacing of a nearest point of the flow control element in the at least one transverse auxiliary bore is within 0.3 to 1.5 main bore diameters, or within 0.4 to 1.25 main bore diameters, or within 0.5 to 1 main bore diameters, or within 0.5 to 0.8 main bore diameters, or within 0.55 to 0.75 main bore diameters from a central longitudinal axis of the main bore.

In embodiments, the valve comprises one of the transverse, intersecting auxiliary bores positioned at a right angle with respect to the central longitudinal axis of the main bore.

In embodiments, the valve comprises two of the transverse auxiliary bores positioned at a right angle with respect to the central longitudinal axis of the main bore; or a combination thereof.

In an embodiment, a system comprises: a plurality of process elements respectively disposed in a plurality of parallel processing paths between first and second multiport ball valves, the multiport ball valves each comprising: a valve body comprising a main bore in fluid communication with a like plurality of auxiliary bores comprising at least one auxiliary bore transversely disposed with respect to the main bore and intersecting the main bore; spherical flow control elements located in the respective auxiliary bores, independently rotatable between an open and a closed position and disposed against a respective valve seat in metal-to-metal sealing contact between the flow control element and the valve body; and a maximum spacing of a nearest surface of the flow control element in the at least one transverse, intersecting auxiliary bore from a central longitudinal axis of the main bore less than two times a diameter of the main bore; and a flow path between the main bore and a respective one of the parallel processing paths through the auxiliary bore and flow control element; a system inlet to the main bore of the first multiport valve; and a system outlet from the main bore of the second multiport valve.

In embodiments, the processing element is selected from pressure letdown valves, flow control valves, isolation valves, filters, heat exchangers, noise attenuation elements, and any combination thereof.

In embodiments, the system further comprises a valved flush line connected to at least one of the parallel processing paths.

In embodiments, the system is modular, or the first and second multiport ball valves and the process elements are mounted on a skid, e.g., to form a module.

In embodiments, the system further comprises a valved bypass line in fluid communication between the main bores of the first and second multiport ball valves.

In embodiments, the system further comprises a control system to operate the multiport ball valves to selectively open and isolate the parallel processing paths with respect to the main bores.

In an embodiment, a method comprises selectively operating the flow control elements in the multiport valves described above between opened and closed position for fluid flow or isolation. In embodiments, the flow control elements may be operated independently for simultaneous or sequential operation. In embodiments, a purge fluid may be supplied to the valve body cavities to flush debris from around the seats.

In an embodiment, a method of processing fluid flow through a plurality of process elements respectively disposed in a plurality of parallel processing paths, comprises: installing the system described above in a process unit with the main bore of any one of the embodiments of the first multiport ball valve connected to an upstream fluid supply and the main bore of the second multiport valve connected to a downstream process line; selectively opening the flow control elements in the respective auxiliary bores of a first one of the parallel processing paths to pass fluid through the respective process element; selectively closing the flow control elements in the respective auxiliary bores of a second one of the parallel processing paths to isolate the respective process element. In embodiments, the method may further comprise isolating and servicing one of the process elements; and opening the flow control elements in the respective parallel processing path to initiate fluid flow through the serviced process element.

Figure 2:
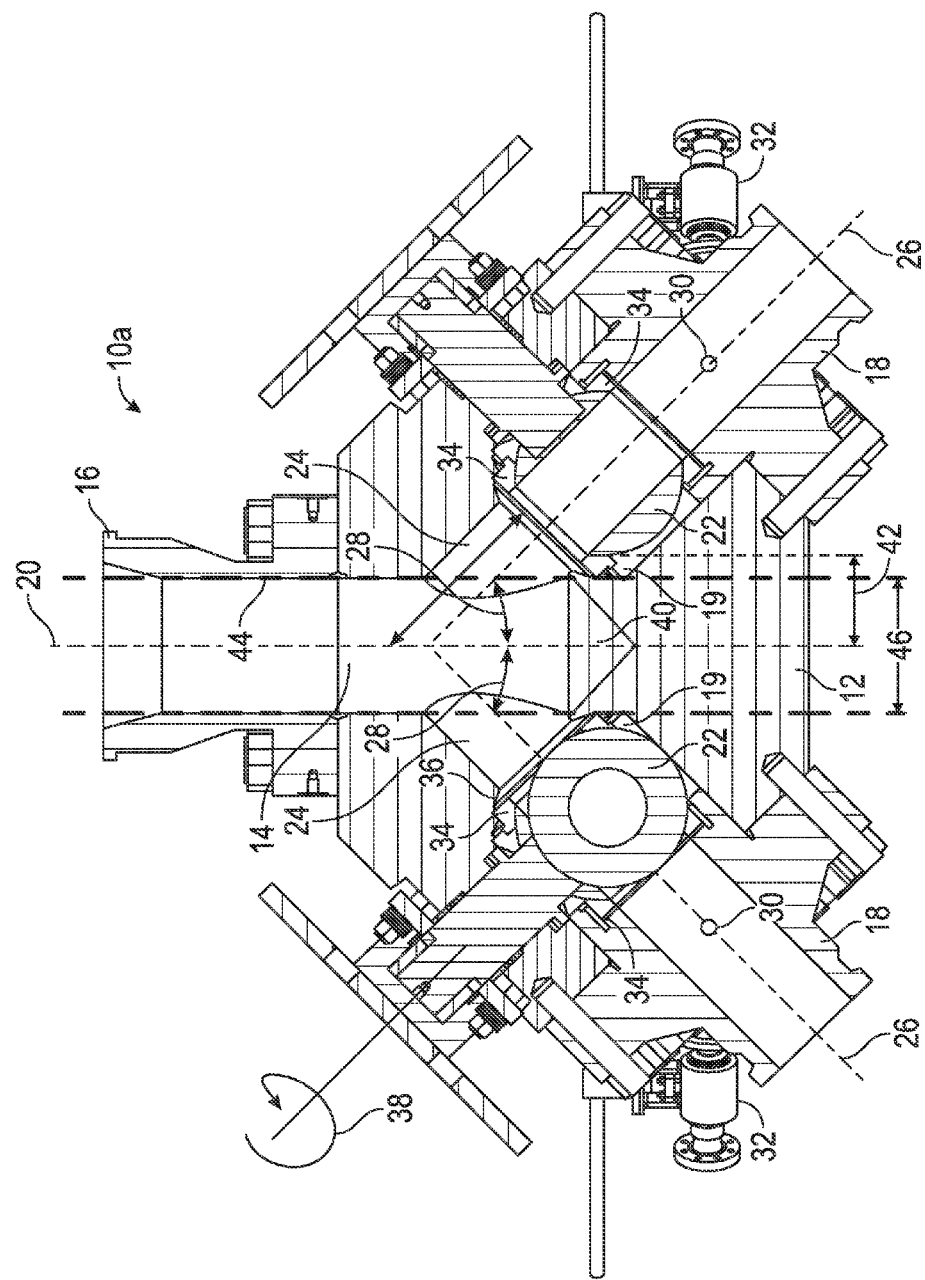
FIG. 2 is a cross-sectional plan view of a multiport valve according to an embodiment.

Referring to FIG. 2, in an embodiment, a multiport severe service ball valve having a Y-pattern, indicated generally as valve 10a comprises a valve body 12 comprising a main bore 14, also referred to in some embodiments as an inlet bore, in fluid communication with two transverse auxiliary bores 24, also referred to herein as outlet bores, which correspond to the number of spherical flow control elements 22, also referred to in some embodiments as the valve "ball". In embodiments an end connector 16 is secured to the valve body 12 for connection to a process line to supply or remove process fluid to or from the main bore 14. In embodiments, the flow control elements 22 are located in valve body cavities 19 formed at respective ends of the auxiliary bores 24 and secured with end connections 18 bolted to the valve body 12. The flow control elements 22 are independently rotatable about stem axis 38 between an open (see right side) and a closed position (see left side). Respective valve seats 34 provide metal-to-metal sealing contact between the flow control element 22 and the valve body 12. Each flow control element 22 may be associated with a valve stem, packing, packing gland and valve handle or operator as known to those in the art.

In an embodiment, a spacing 42 of a nearest surface of the flow control element 22 from a central longitudinal axis 20 of the main bore 14 is less than two times a diameter 46 of the main bore 14. In embodiments, the spacing 42 of a nearest point of the flow control element 22 is within 0.3 to 1.5 main bore diameters 46, or within 0.4 to 1.25 main bore diameters 46, or within 0.5 to 1 main bore diameters 46, or within 0.5 to 0.8 main bore diameters 46, or within 0.55 to 0.75 main bore diameters 46 from the central longitudinal axis 20. Due to the arrangement of the auxiliary bores 24 within the valve body 12 and the close proximity of the flow control elements 22 to the main bore 14, there is minimal dead space in the auxiliary bores 24 in which debris can accumulate while one of the flow control elements 22 is closed and the other is opened for fluid flow. Also, the close proximity of the flow control elements 22 facilitates less temperature variation and thus lower stresses during thermal cycling, as when one port is opened and the other closed to change the direction for the flow of a hot (or cold) fluid.

In an embodiment, the spacing 42 is less than the clear space required for an equivalently rated flange connection according to ANSI B1610 or an equivalent thereof, based on the inner diameter of the bore and the pressure/temperature rating of the severe service ball valve. In the FIG. 1 arrangement, the flange 3 must be located a sufficient distance from the opposite lateral of the multiport adaptor 1 so that the bolts 4 can be accesses for assembly and/or disassembly. In addition the flange 3 adds length to the "dead space" created in the length of flow passage between the entry port into the valve adaptor 1 and the flow control element; plus the length of the end connector 2 (See FIG. 1). In embodiments, the spacing 42 between the flow control element 22 and the central longitudinal axis 20 of the main bore 14 is less than the spacing which would be required to attach a severe service ball valve to a multiport flange with a bolted flange arrangement, as specified by ANSI B1610 or an equivalent thereof, which would require a minimum distance equal to the width of the flange 3, plus the spacing to access the nuts 4 with a wrench, combined with the length of the end connector in the valve 2 (See FIG. 1).

In an embodiment, a central longitudinal axis 26 in each auxiliary bore 24 is arranged within valve body 12 at an angle 28 of about 95° to about 175° relative to the main bore central longitudinal axis 20. Accordingly, in an embodiment, two of the transverse, intersecting auxiliary bores 24 in a Y configuration include a central longitudinal axis 26 of the transverse, intersecting auxiliary bores 24 which is arranged within the valve body 12 at an angle 28 from about 95° to about 175°, or from about 105° to about 165°, or from about 120° to about 150°, or from about 125° to about 145°, or about 135°, relative to the central longitudinal axis 20 of the main bore 14.

In an embodiment as seen in FIG. 2, the main bore 14 terminates at a coaxial concave frustoconical recess 40. In embodiments, solids or debris can accumulate in the recess 40, thereby providing a self-protecting effect whereby the solids accumulation can inhibit erosion. Alternatively or additionally, the direct impingement at the recess 40 may provide a turbulent zone to constantly entrain and flush any solids away.

Figure 3:
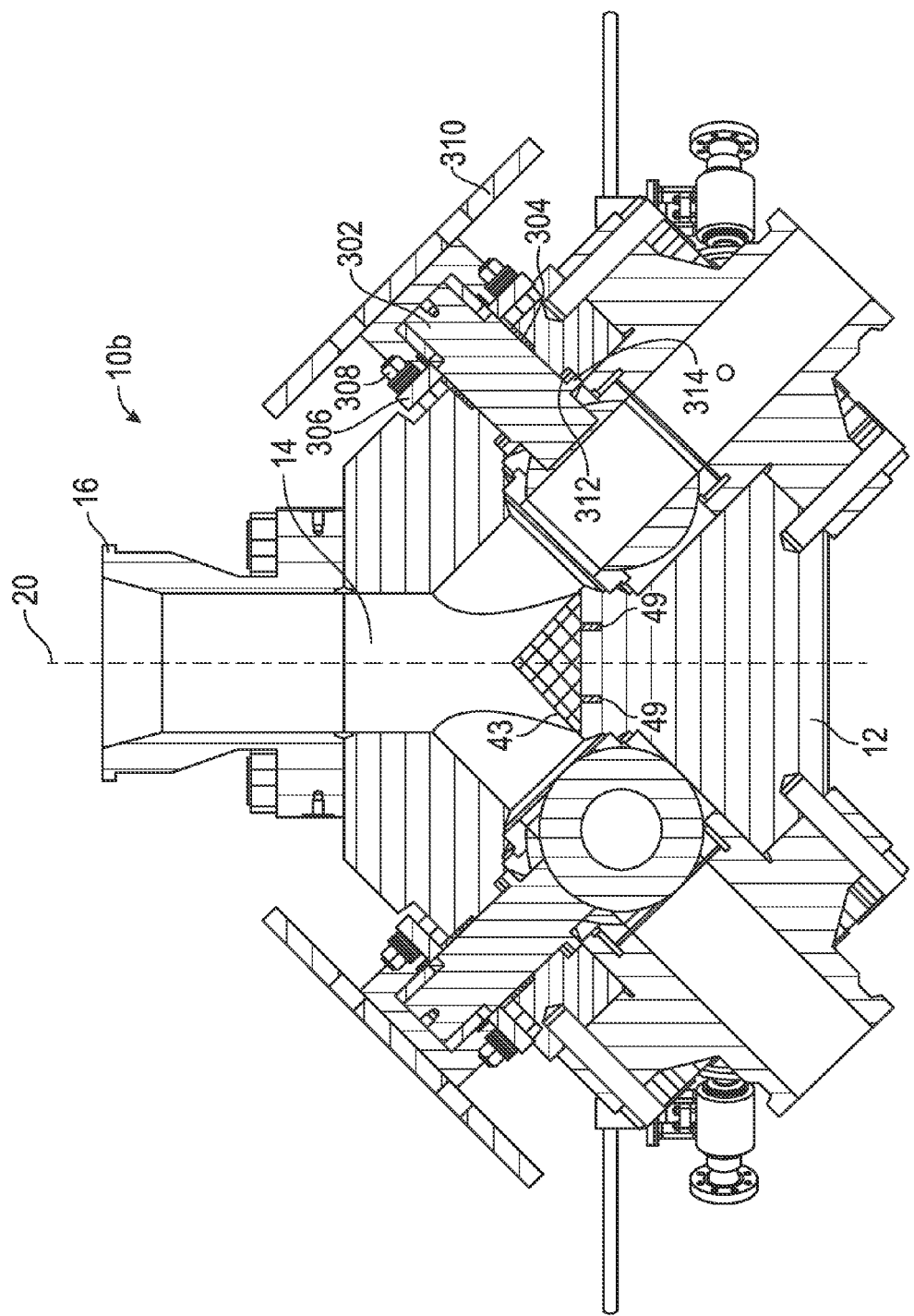
FIG. 3 is a cross-sectional plan view of a multiport valve according to another embodiment.

In an embodiment, shown in FIG. 3, the main bore 14 terminates at a transverse convex impingement element 43 secured to the valve body 12. In an embodiment, the impingement element 43 is coaxial with the main bore 14. In an embodiment, the impingement element may be removably attached to the valve body 12 by threaded members 49, or other mechanical attachment device. In an embodiment, the impingement element 43 may comprise a ceramic wear surface, a metallic wear surface, and/or a sacrificial surface, and the impingement element may be periodically removed and replaced.

FIG. 3 also shows the stem 302, packing 304, gland thruster 306, thrust bolts 308, operator mounting platform 310, bearing 312 and blowout stop shoulder 314, which may be present in various embodiments. For assembly, the stem 302 with the bearing 314 in place may be inserted via the open end of the bore 24 before the flow control element 22 and end connection are installed, and the flow control element 22 has a slot or detent on the top which will engage the keyed lower portion of the stem 302 when installed. When the seats 34, spring 36, and ball 22 are installed, then the end connector 16 may be installed to keep the ball in the valve body cavity. The packing 304, gland thruster 306 and thrust bolts 308 are installed from the top of the valve 10. In other embodiments the ball may be a side, top or bottom entry, and/or the stem may be inserted from the top or side of the bonnet, all as known to those skilled in the art.

Figure 4:
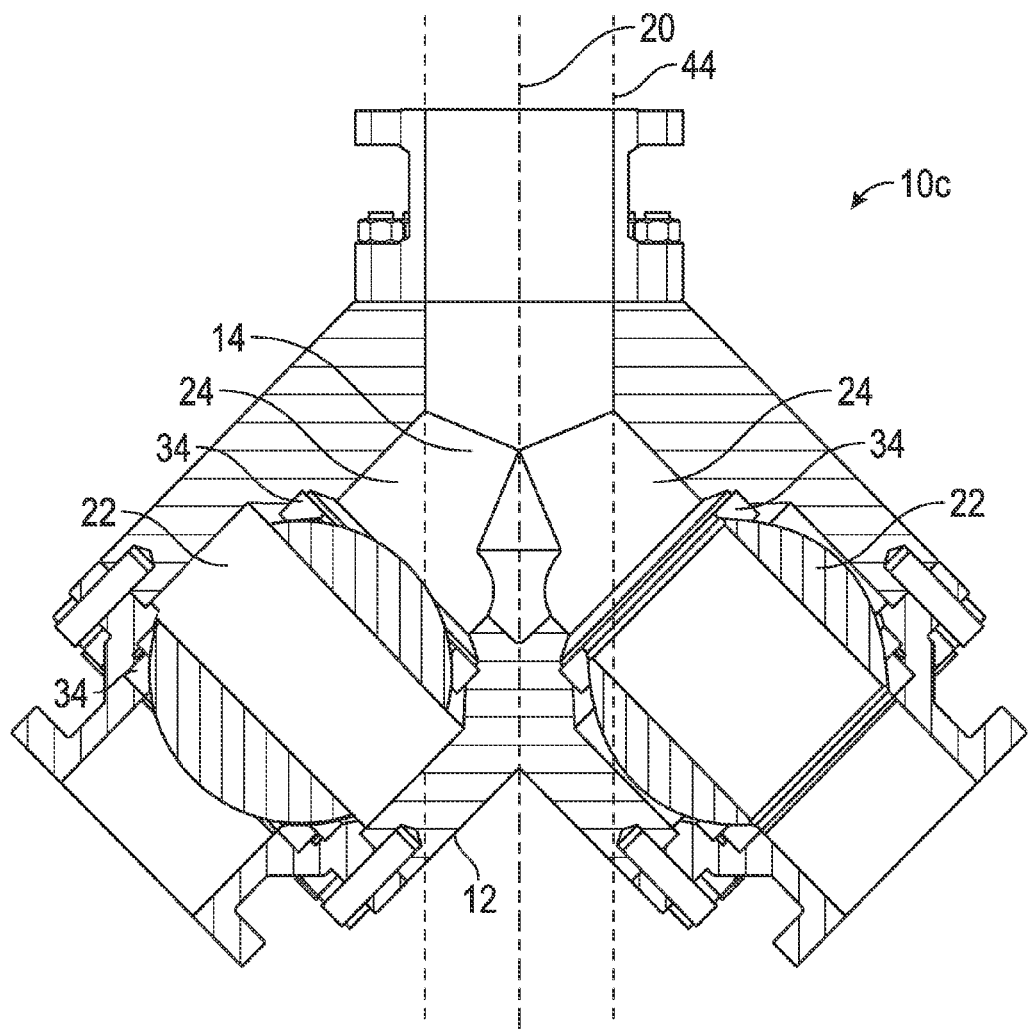
FIG. 4 is a cross-sectional plan view of a multiport valve according to another embodiment.

As shown in FIGS. 2 and 3, in embodiments, each of the pairs of valve seats 34, as well as the flow control elements 22, are located entirely outside of the projection of the main bore 14. In another embodiment, shown in FIG. 4, in the valve 10c portions of the flow control elements 22 and/or a portion of the valve seats 34 of auxiliary bores 24 are located in the valve body 12 within the bounds of the projection of the main bore 14 and thus, located within the valve body 12 such that at least a portion of the flow control element 22 and/or a portion of at least one of the pair of valve seats 34 of auxiliary bore 24 are intersected by a line representative of the projection of the outer surface 44 of the main bore 14.

Figure 5:
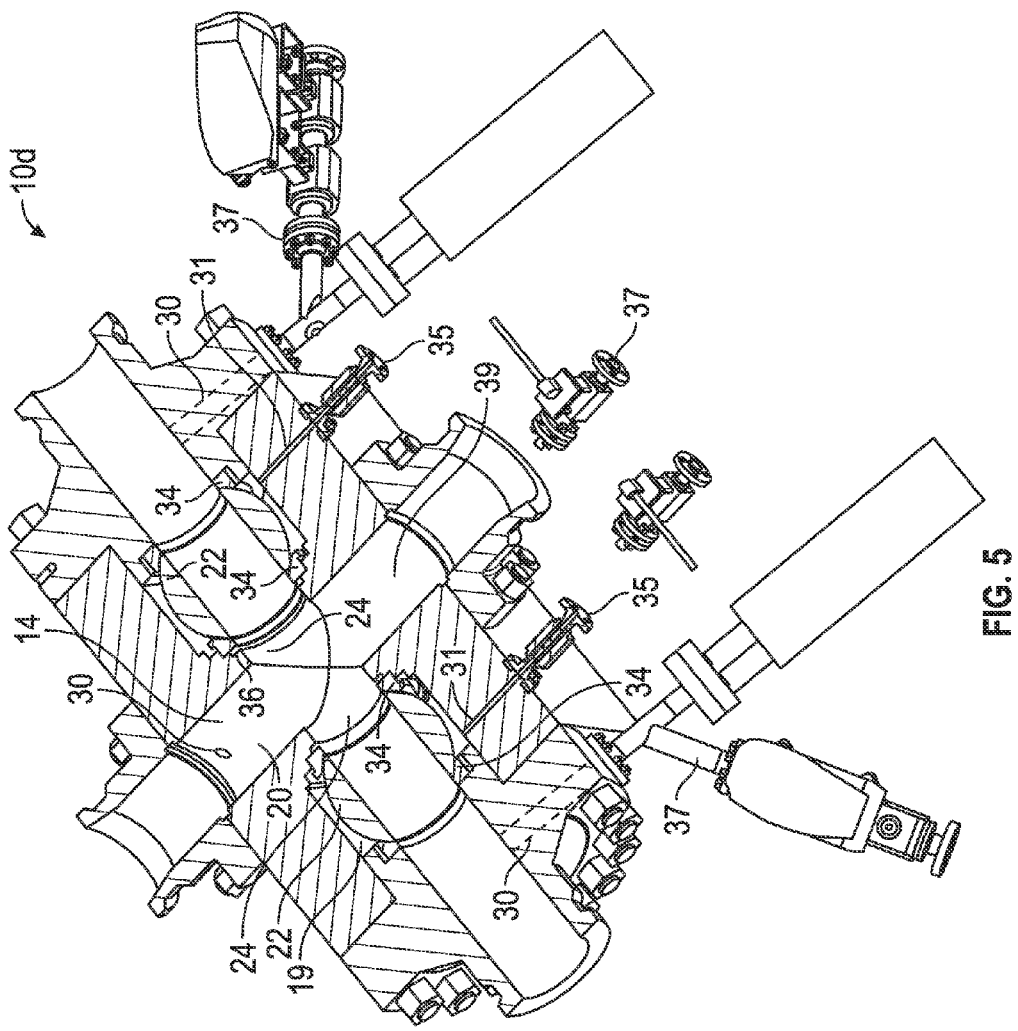
FIG. 5 is a perspective sectional view of a 4-way multiport valve according to another embodiment.

As shown in FIG. 5, in further embodiments, the 4-way valve 10d may further comprise a coaxial auxiliary bore 39 in fluid communication with the main bore 14. In embodiments, the auxiliary bores 24 are at right angles to the main bore 14. The 4-way valve 10d might be used, as one example, as a mixing valve wherein a process fluid is supplied through the main bore 14 and coaxial auxiliary bore 39, while an additive fluid(s) might be introduced through the transverse auxiliary bore(s) 24.

As best seen in FIG. 5, in an embodiment, the valve 10d may further comprise purge flow passages 31 to supply a purge fluid from purge inlet valve 35 to the valve body cavities 19. The purge fluid may inhibit debris from otherwise accumulating at the valve seats 34 or valve springs 36 and interfering with the metal to metal seal.

In an embodiment, the valve 10d may further comprise a flush flow passage 30 through the end connectors to introduce a flush fluid from flush inlets 37 opposite the flow control elements 22 in the auxiliary bores 24. In an embodiment, two or more of a plurality of flush flow passages 30 may be put into fluid communication with each other through at least a portion of one of the fluid paths as part of a system comprising one or more embodiments of the multiport severe service ball valve. The flush system may be in fluid communication with a supply of temperature controlled flush fluid, steam, compressed gas, and/or the like as part of a flush system 202 (see FIG. 7).

Figure 6:
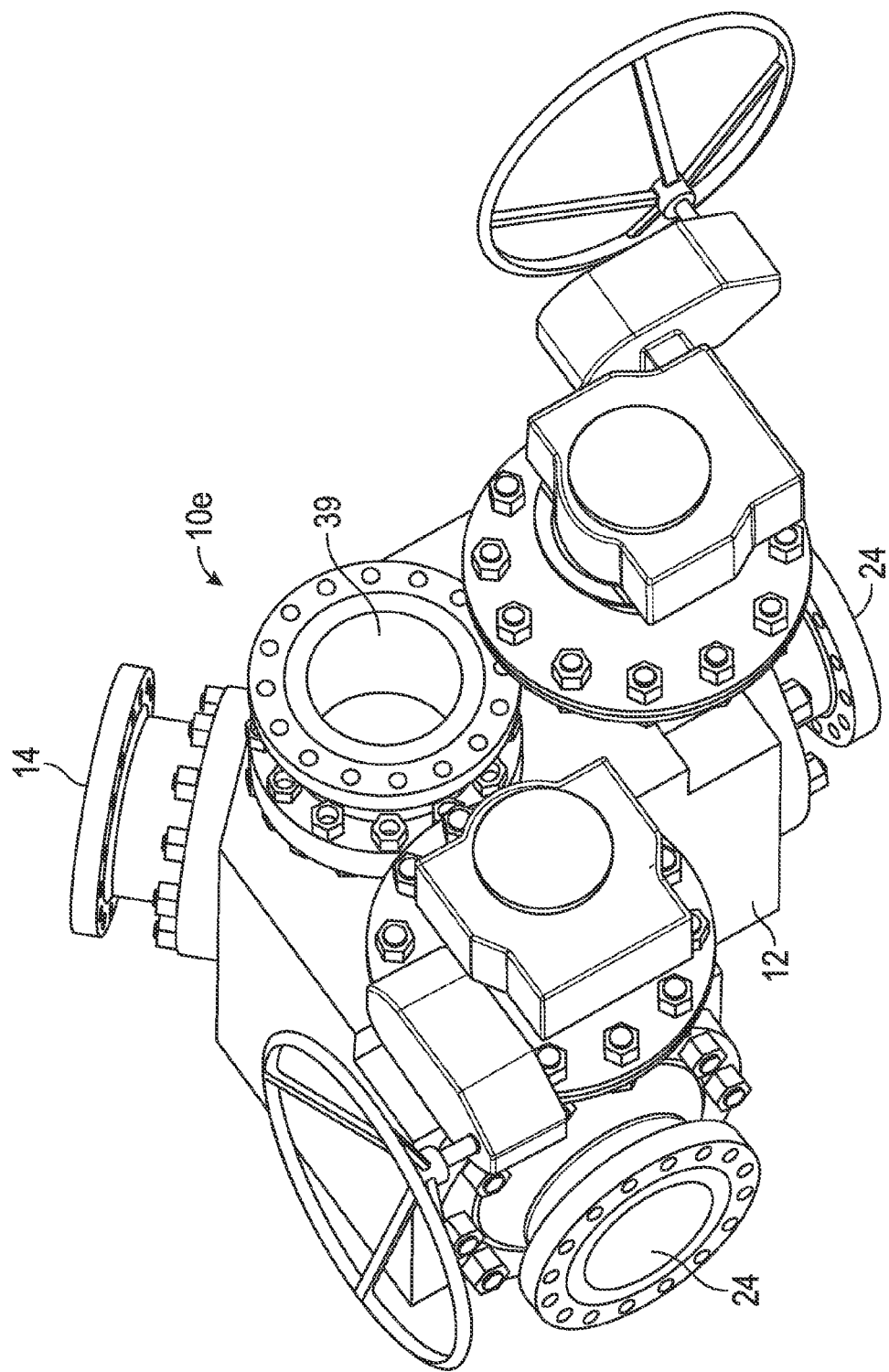
FIG. 6 is a perspective view of a 4-way Y-pattern multiport valve according to another embodiment.

FIG. 6 shows a perspective view of an embodiment of a 3-way Y-pattern valve 10e similar to valve 10a in FIG. 2, and further comprising a transverse auxiliary bore 39 located orthogonal to the plane of the main bore 14 and the Y-pattern auxiliary bores 24. The auxiliary bore 39 is open, i.e., it does not include a flow control element, and may be connected to a valved line for use as a bypass, for example.

Figure 7:
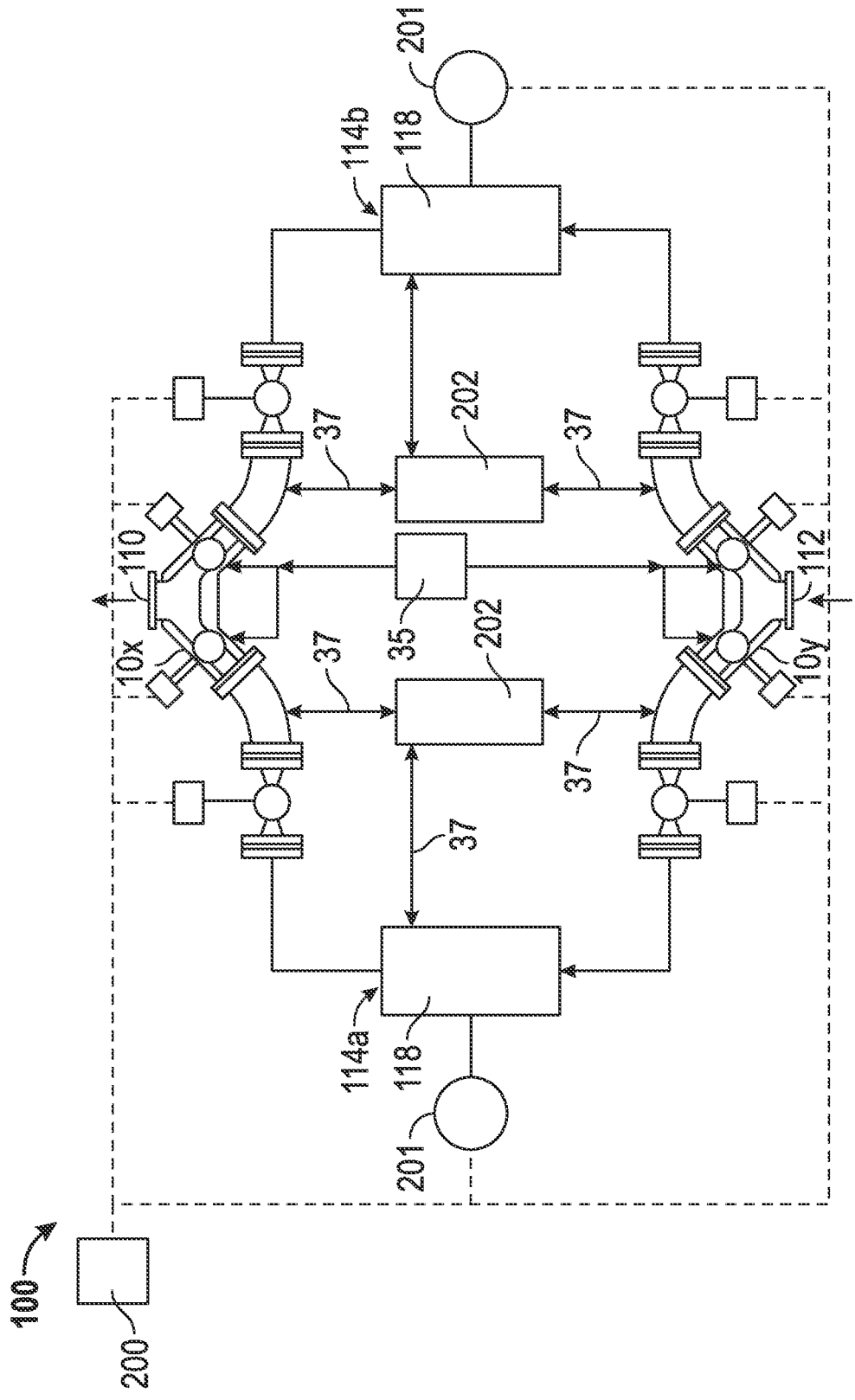
FIG. 7 is a schematic view of a multiport valve system according to another embodiment.

In an embodiment, as shown schematically in FIG. 7, a system 100 comprises a system inlet 110 in fluid communication with a system outlet 112 through one or more multiport severe service ball valves 10x, 10y. Accordingly, in an embodiment, a system 100 comprises process elements 118 respectively disposed in parallel processing paths 114a and 114b between first and second multiport ball valves 10y and 10x as described herein. System inlet 110 is connected to the main bore of the first multiport valve 10y; and system outlet 112 to the main bore of the second multiport valve 10x.

The system shown in FIG. 7 includes two redundant flow paths 114a and 114b, each comprising a process element 118, which may be identical, or which may include alternative process elements and components depending on the particular application. In an embodiment, the processing element 118 may be selected from pressure let down valves, flow control valves, isolation valves, filters, heat exchangers, noise attenuation elements, and so on, any combination thereof.

As shown in FIG. 7, in an embodiment, the system may further comprise a plurality of flush valves or flush inlets 37 in fluid communication with each other through at least a portion of one of the fluid paths of the system. The system may further comprise one or more purge inlets 35 as described herein. The system may further comprise a control system 200 to operate the multiport ball valves 10x, 10y to selectively open and isolate the parallel processing paths 114a, 114b with respect to the main bores. Accordingly, in an embodiment, the system 100 may further comprise a control system 200 which may optionally be computer- or microprocessor-controlled to independently operate any one of the flow control elements present in the system, which may include the flow control elements of the multiport severe service ball valves 10x, 10y. The system 200 may receive inputs from transmitters 201, e.g., pressure, temperature, differential pressure, chemical composition, pH, or the like. System 200 may provide control over the flush fluid 202 and lines 37, the purge valves 35, and any of the process elements 118, in a sequence necessary to provide safe establishment of fluid communication between the system inlet 110 and the system outlet 112 along one or both of the parallel processing paths 114a or 114b, or to isolate either or both of the parallel processing paths 114a, 114b. In an embodiment, the control system 200 is capable of autonomous operation, semi-autonomous operation, manual operation or a combination thereof.

Figure 8:
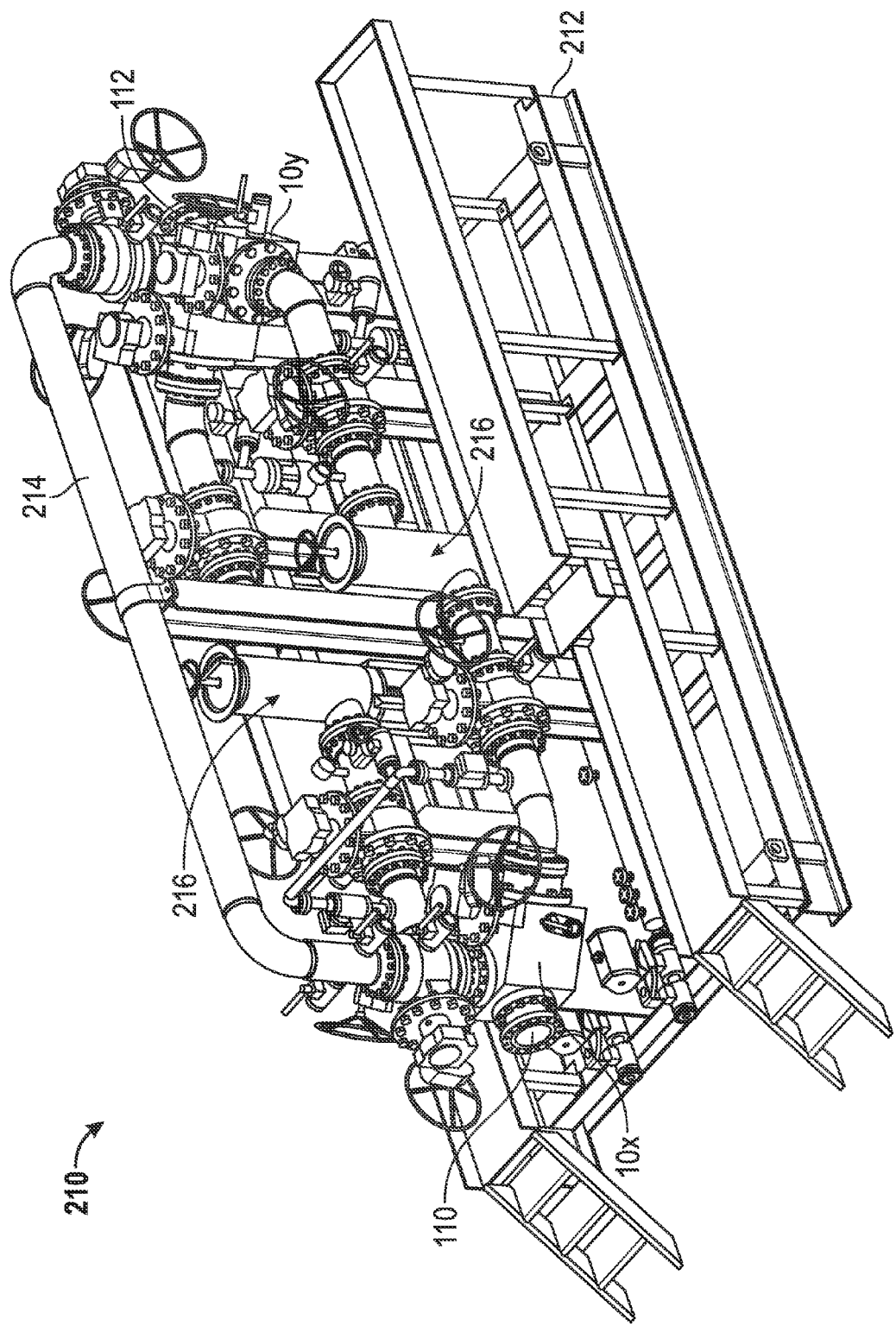
FIG. 8 is a perspective view of a modular multiport valve system according to another embodiment.

As shown in FIG. 8, in an embodiment, the system 210 comprises first and second multiport ball valves 10x, 10y and the process elements 216 are mounted on a skid 212 to form a module. In an embodiment, the system 210 may further comprise a valved bypass line 214 in fluid communication between the main bores of the multiport ball valves 10x, 10y through respective open auxiliary bores. The multiport valves 10x, 10y in FIG. 8 are similar to the multiport valve 10e shown in FIG. 6.

Figure 9:
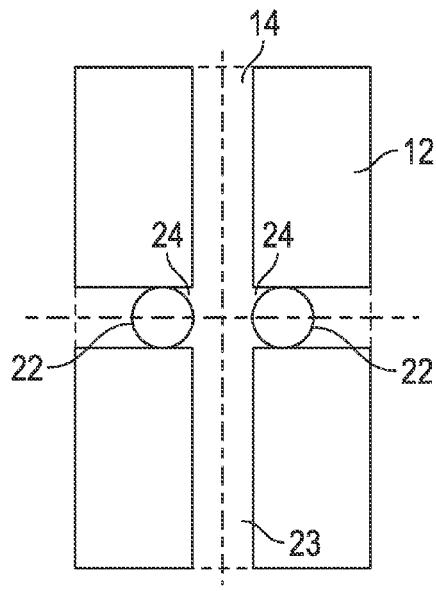
FIG. 9 is a block diagram of a 4-way valve configuration according to another embodiment.

In an embodiment, shown in block diagram form in FIG. 9, the main bore 14 is coaxial with open auxiliary bore 23 to provide a flow path through the length of the valve body 12, and transverse auxiliary bores 24 are provided with flow control elements 22.

Figure 10:
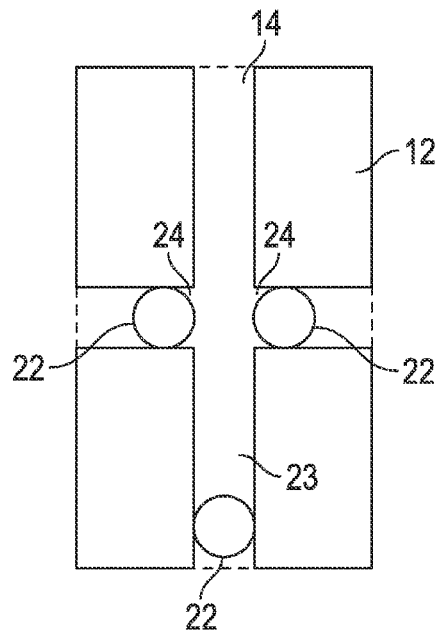
FIG. 10 is a block diagram of a 4-way valve configuration according to another embodiment.

In an embodiment, shown in block diagram form in FIG. 10, a flow control element 22 is also located in the coaxial auxiliary bore 23 to provide flow control at each of the auxiliary bores.

Figure 11:
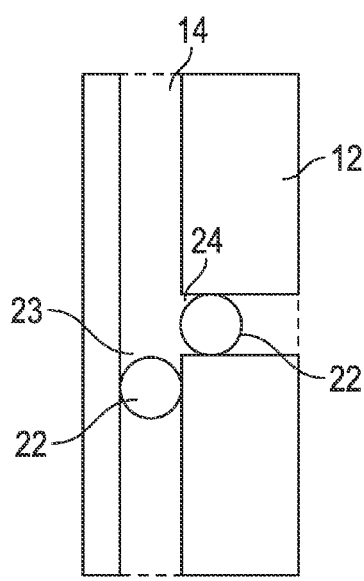
FIG. 11 is a block diagram of a 3-way valve configuration according to another embodiment.

In an embodiment as shown in FIG. 11, a coaxial auxiliary bore is provided, and a transverse auxiliary bore 24 may be positioned at a right angle with respect to the main bore 14, with flow control elements 22 in each of the auxiliary bores proximate to the intersection.

Figure 12:
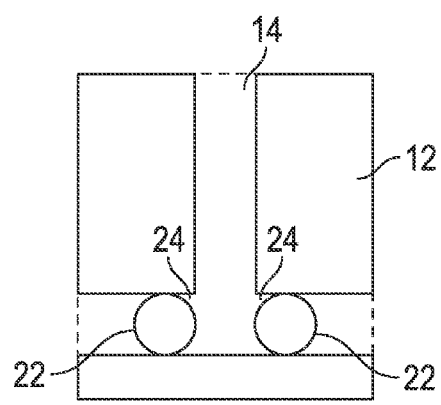
FIG. 12 is a block diagram of a 3-way valve configuration according to another embodiment.

As shown in FIG. 12, two transverse auxiliary bores 24 may be positioned at a right angle with respect to the main bore 14, and each provided with a flow control element 22 in close proximity to the main bore 14.

Embodiments Listing

Embodiments of the multiport severe service ball valve, systems, and processes comprising the same include:

A. A multiport severe service ball valve comprises a valve body comprising a main bore in fluid communication with a plurality of auxiliary bores comprising at least one transverse auxiliary bore intersecting the main bore; a spherical flow control element rotatable in a valve body cavity of the at least one transverse auxiliary bore between open and closed positions; a valve seat in metal-to-metal sealing contact between the flow control element and the valve body; and a spacing of the flow control element in the at least one transverse auxiliary bore within two main bore diameters from a central longitudinal axis of the main bore.

B. The valve according to embodiment A comprising two of the transverse auxiliary bores intersecting the main bore in a Y configuration wherein central longitudinal axes of the transverse auxiliary bores are arranged within the valve body at an angle from about 95° to about 175°, or from about 105° to about 165°, or from about 120° to about 150°, or from about 125° to about 145°, or about 135°, relative to the central longitudinal axis of the main bore.

C. The valve according to embodiment A or embodiment B, wherein the main bore terminates at a coaxial concave frustoconical recess.

D. The valve according to any one of embodiments A to C, wherein the main bore terminates at a transverse convex surface.

E. The valve according to any one of embodiments A to D, wherein the main bore terminates at a convex frustoconical projection, a coaxial frustoconical projection or a convex coaxial frustoconical projection.

F. The valve according to any one of embodiments A to E, wherein the main bore terminates at a removably attached impingement element.

G. The valve according to embodiment F, wherein the impingement element comprises a ceramic wear surface.

H. The valve according to any one of embodiments A to G, wherein the valve seat and the flow control element of the at least one transverse auxiliary bore are located entirely outside a projection of an outer surface of the main bore.

I. The valve according to any one of embodiments A to H, further comprising a purge flow passage(s) to the valve seat body cavity(ies).

J. The valve according to any one of embodiments A to I, further comprising an auxiliary bore coaxial with the main bore, a spherical flow control element rotatable in a valve body cavity of the coaxial auxiliary bore between open and closed positions, and a valve seat in metal-to-metal sealing contact between the coaxial auxiliary flow control element and the valve body.

K. The valve according to any one of embodiments A to J, wherein a spacing of a nearest point of the flow control element in the at least one transverse auxiliary bore is within 0.3 to 1.5 main bore diameters, or within 0.4 to 1.25 main bore diameters, or within 0.5 to 1 main bore diameters, or within 0.5 to 0.8 main bore diameters, or within 0.55 to 0.75 main bore diameters from a central longitudinal axis of the main bore.

L. The valve according to any one of embodiments A to K, comprising one of the transverse auxiliary bores positioned at a right angle with respect to the central longitudinal axis of the main bore.

M. The valve according to any one of embodiments A to L, comprising two of the transverse auxiliary bores positioned at a right angle with respect to the central longitudinal axis of the main bore.

N. A system comprising: a plurality of process elements respectively disposed in a like plurality of parallel processing paths between first and second multiport severe service ball valves according to any one of embodiments A to M; a flow path between the main bores and a respective one of the parallel processing paths through the respective auxiliary bores and flow control elements; a system inlet to the main bore of the first multiport valve; and a system outlet from the main bore of the second multiport valve.

O. A system comprising: a plurality of process elements respectively disposed in a like plurality of parallel processing paths between first and second multiport severe service ball valves, the multiport severe service ball valves each comprising a valve body comprising a main bore in fluid communication with a like plurality of auxiliary bores comprising at least one transverse auxiliary bore intersecting the main bore; spherical flow control elements rotatable in respective valve body cavities of the auxiliary bores between open and closed positions; valve seats in metal-to-metal sealing contact between respective flow control elements and the valve body; and a spacing of the flow control elements in the at least one transverse auxiliary bore within two main bore diameters from a central longitudinal axis of the main bore; a flow path between the main bores and a respective one of the parallel processing paths through the respective auxiliary bores and flow control elements; a system inlet to the main bore of the first multiport valve; and a system outlet from the main bore of the second multiport valve.

P. The system according to embodiment N or embodiment O, wherein the process element is selected from pressure letdown valves, flow control valves, isolation valves, filters, heat exchangers, noise attenuation elements, and any combination thereof.

Q. The system according to any one of embodiments N to P, further comprising a valved flush line connected to at least one of the parallel processing paths.

R. The system according to any one of embodiments N to Q, wherein the system is modular;

S. The system according to any one of embodiments N to R, wherein the first and second multiport ball valves and the process elements are mounted on a skid to form a module.

T. The system according to any one of embodiments N to S, further comprising a valved bypass line in fluid communication between the main bores of the first and second multiport ball valves.

U. The system according to any one of embodiments N to T, further comprising a control system to operate the multiport ball valves to selectively open and isolate the parallel processing paths with respect to the main bores.

V. A method, comprising selectively operating the flow control elements in the multiport valves according to any one of embodiments A to M, or in the multiport valves in the systems according to any one of embodiments N to U, between opened and closed position for fluid flow or isolation.

W. The method of embodiment V, further comprising independently operating the flow control elements for simultaneous or sequential operation.

X. The method of embodiment V or embodiment W, further comprising supplying a purge fluid to the valve body cavities to flush debris from around the seats.

Y. A method of processing fluid flow through a plurality of process elements respectively disposed in a like plurality of parallel processing paths, comprising: installing a system according to any one of embodiments N to U in a process unit with the main bore of the first multiport ball valve connected to an upstream fluid supply and the main bore of the second multiport valve connected to a downstream process line; selectively opening the flow control elements in the respective auxiliary bores of a first one of the parallel processing paths to pass fluid through the respective process element; selectively closing the flow control elements in the respective auxiliary bores of a second one of the parallel processing paths to isolate the respective process element.

Z. The method of embodiment Y, further comprising isolating and servicing the isolated process element.

AA. The method of embodiment Z, further comprising opening the flow control elements in the respective parallel processing path to initiate fluid flow through the serviced process element.

BB. The method of any one of embodiments Y to AA, further comprising assembling the system in a module at a location remote from the process unit; and transporting the module to the process unit for the installation.

CC. The method of embodiment BB, further comprising removing the installed module from the process unit; transporting the module to a location remote from the process unit; and servicing the module at the remote location.

DD. Any one of the foregoing embodiments A to CC characterized by at least two auxiliary bores comprising flow control elements.

EE. Any one of the foregoing embodiments A to DD further comprising a stem, packing, gland thruster and a valve operator associated with each of the flow control elements in the auxiliary bores.

FF. Embodiment EE further comprising a stem bearing about the stem.

GG. Embodiment EE or embodiment FF further comprising a blowout stop shoulder on the stem.

HH. Any one of the foregoing embodiments A to GG wherein the main bore is open (has no flow control element).

II. Any one of the foregoing embodiments A to HH further comprising an end connector attached to the valve body at an opening to the main bore.

JJ. Any one of the foregoing embodiments A to II further comprising end connector(s) attached to the valve body at the respective valve body cavity(s) to retain the respective flow control element(s).

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

What is claimed is:

1. A system comprising:
a plurality of process elements respectively disposed in a plurality of parallel processing paths between first and second multiport severe service ball valves, the multiport severe service ball valves each comprising:
a valve body comprising a main bore in fluid communication with a like plurality of auxiliary bores comprising at least one transverse auxiliary bore intersecting the main bore;
spherical flow control elements rotatable in respective valve body cavities of the auxiliary bores between open and closed positions;
valve seats in metal-to-metal sealing contact between respective flow control elements and the valve body; and
a spacing of the flow control elements in the at least one transverse auxiliary bore within two main bore diameters from a central longitudinal axis of the main bore;
a flow path between the main bores and a respective one of the parallel processing paths through the respective auxiliary bores and flow control elements;
a system inlet to the main bore of the first multiport valve;
a system outlet from the main bore of the second multiport valve; and
wherein each of the flow control elements in each of the multiport severe service ball valves is independently operable to establish fluid communication between the system inlet and the system outlet along one or more of the plurality of parallel processing paths, or to isolate one or more of the plurality of parallel processing paths; and
a control system to operate the multiport severe service ball valves to selectively open and isolate the parallel processing paths with respect to the main bores.

2. The system of claim 1, wherein the process element is selected from pressure letdown valves, flow control valves, isolation valves, filters, heat exchangers, noise attenuation elements, and any combination thereof.

3. The system of claim 1, further comprising a valved flush line connected to at least one of the parallel processing paths.

4. The system of claim 1, wherein the first and second multiport ball valves and the process elements are mounted on a skid to form a module.

5. The system of claim 1, further comprising a valved bypass line in fluid communication between the main bores of the first and second multiport ball valves.

6. The system of claim 1, wherein the main bore of each of the multiport severe service ball valves terminates at a coaxial concave frustoconical recess.

7. The system of claim 1, wherein the main bore of each of the multiport severe service ball valves terminates at a coaxial-convex frustoconical projection.

8. The system of claim 1, wherein the main bore of each of the multiport severe service ball valves terminates at a removably attached impingement element.

9. The system of claim 8, wherein the impingement element comprises a transverse convex surface.

10. The system of claim 8, wherein the removably attached impingement element comprises a ceramic wear surface.

11. The system of claim 1, wherein each of the multiport severe service ball valves comprise the valve seat and flow control element of at least one transverse auxiliary bore located entirely outside a linear projection of an outer surface of the respective main bore.

12. The system of claim 1, wherein each of the multiport severe service ball valves comprise a spacing of a nearest point of the flow control element of at least one transverse auxiliary bore within 0.5 to 0.8 main bore diameters from a central longitudinal axis of the respective main bore.

13. The system of claim 1, wherein each of the multiport severe service ball valves comprise an auxiliary bore coaxial with the respective main bore;
 a spherical flow control element rotatable in a valve body cavity of the coaxial auxiliary bore between open and closed positions; and
 a valve seat in metal-to-metal sealing contact between the coaxial auxiliary flow control element and the valve body.

14. The system of claim 1, wherein each of the multiport severe service ball valves comprise a purge flow passage to the respective valve body cavity.

15. The system of claim 1, wherein each of the multiport severe service ball valves comprise one of the transverse, intersecting auxiliary bores positioned at a right angle with respect to the central longitudinal axis of the respective main bore.

16. The system of claim 1, wherein each of the multiport severe service ball valves comprise two of the transverse, intersecting auxiliary bores positioned at a right angle with respect to the central longitudinal axis of the respective main bore.

17. A method of processing fluid flow through a plurality of process elements respectively disposed in a like plurality of parallel processing paths, comprising:
 installing a system in a process unit, the system comprising the plurality of parallel processing flow paths comprising the respective process elements disposed between a first and a second multiport severe service ball valve, each of the multiport severe service ball valves comprising:
  a valve body comprising a main bore in fluid communication with a like plurality of auxiliary bores comprising at least one transverse auxiliary bore intersecting the main bore;
  spherical flow control elements rotatable in respective valve body cavities of the auxiliary bores between open and closed positions;
  valve seats in metal-to-metal sealing contact between respective flow control elements and the valve body; and
  a spacing of the flow control elements in the at least one transverse auxiliary bore within two main bore diameters from a central longitudinal axis of the main bore;
 wherein the main bore of the first multiport ball valve is connected to an upstream fluid supply and the main bore of the second multiport valve is connected to a downstream process line;
 selectively opening the flow control elements in the respective auxiliary bores of a first one of the parallel processing paths to pass fluid through the respective process elements;
 with the flow control elements in the first parallel processing path open, selectively closing the flow control elements in the respective auxiliary bores of a second one of the parallel processing paths to isolate the respective process elements;
 servicing the isolated process elements; and
 selectively opening the flow control elements in the respective auxiliary bores of the first and second parallel processing paths to initiate fluid flow through the serviced process elements and simultaneously pass fluid through the respective process elements of the first and second ones of the parallel processing paths.

18. The method of claim 17, further comprising maintaining fluid communication between the main bores and the respective spaces between the flow control elements in the transverse auxiliary bores and the main bores during the opening and closing of the respective flow control elements.

19. The method of claim 17, wherein each of the multiport severe service ball valves comprises a valve body comprising two of the transverse auxiliary bores intersecting the main bore in a Y configuration wherein central longitudinal axes of the transverse auxiliary bores are arranged within the valve body at an angle from about 95° to about 175° relative to the central longitudinal axis of the main bore.

20. The method of claim 17, wherein each of the multiport severe service ball valves comprises a valve body comprising a spacing of a nearest point of the flow control element of at least one transverse auxiliary bore within 0.5 to 0.8 main bore diameters from a central longitudinal axis of the respective main bore.

21. A system, comprising:
 a plurality of process elements respectively disposed in a plurality of parallel processing paths between first and second multiport severe service ball valves, the multiport severe service ball valves each comprising:
  a valve body comprising a main bore in fluid communication with a like plurality of auxiliary bores comprising at least one transverse auxiliary bore intersecting the main bore;
  spherical flow control elements rotatable in respective valve body cavities of the auxiliary bores between open and closed positions;
  valve seats in metal-to-metal sealing contact between respective flow control elements and the valve body; and
  a spacing of the flow control elements in the at least one transverse auxiliary bore within two main bore diameters from a central longitudinal axis of the main bore;
 a flow path between the main bores and a respective one of the parallel processing paths through the respective auxiliary bores and flow control elements;
 a system inlet to the main bore of the first multiport valve;
 a system outlet from the main bore of the second multiport valve; and
 wherein each of the multiport severe service ball valves comprise two of the transverse auxiliary bores intersecting the main bore in a Y configuration wherein central longitudinal axes of the transverse auxiliary bores are arranged within the valve body at an angle from 95° to 175° relative to the central longitudinal axis of the main bore.

22. A system, comprising:
 a plurality of process elements respectively disposed in two parallel processing paths between first and second multiport severe service ball valves, the multiport severe service ball valves each comprising:
  a valve body comprising a main bore in fluid communication with two transverse auxiliary bores intersecting the main bore;
  spherical flow control elements rotatable in respective valve body cavities of the auxiliary bores between open and closed positions, inclusively, wherein the control elements are rotated to the open position;
  valve seats in metal-to-metal sealing contact between respective flow control elements and the valve body; and
  a spacing of the flow control elements in the at least one transverse auxiliary bore within two main bore diameters from a central longitudinal axis of the main bore;

first and second flow paths between the main bores and respective first and second parallel processing paths through the respective auxiliary bores and flow control elements;

a system inlet to the main bore of the first multiport valve;

a system outlet from the main bore of the second multiport valve;

wherein each of the multiport severe service ball valves comprise two of the transverse, intersecting auxiliary bores and respective spherical flow control elements rotated to the open positions; and wherein each of the main bores is simultaneously in open fluid communication with each of the respective auxiliary bores to provide the two respective flow paths between the main bores and the parallel processing paths through the respective auxiliary bores and flow control elements.

\* \* \* \* \*